United States Patent
Wu

(10) Patent No.: US 10,273,384 B2
(45) Date of Patent: Apr. 30, 2019

(54) ADHESIVE TAPE COMPOSITION AND ADHESIVE TAPE PREPARED FROM SAME

(71) Applicant: 3M INNOVATIVE PROPERTIES COMPANY, St. Paul, MN (US)

(72) Inventor: Qing Wu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 153 days.

(21) Appl. No.: 14/368,118

(22) PCT Filed: Dec. 21, 2012

(86) PCT No.: PCT/US2012/071123
§ 371 (c)(1),
(2) Date: Jun. 23, 2014

(87) PCT Pub. No.: WO2013/101693
PCT Pub. Date: Jul. 4, 2013

(65) Prior Publication Data
US 2014/0349054 A1    Nov. 27, 2014

(30) Foreign Application Priority Data
Dec. 27, 2011    (CN) .......................... 2011 1 0444884

(51) Int. Cl.
| | |
|---|---|
| *C09J 4/06* | (2006.01) |
| *C09J 7/20* | (2018.01) |
| *C08F 220/10* | (2006.01) |
| *C08F 283/10* | (2006.01) |

(52) U.S. Cl.
CPC .............. *C09J 4/06* (2013.01); *C08F 283/10* (2013.01); *C09J 7/20* (2018.01); *C09J 2433/00* (2013.01); *C09J 2463/00* (2013.01); *Y10T 428/1457* (2015.01)

(58) Field of Classification Search
CPC .............. C08F 283/10; C09J 4/06; C09J 7/02
See application file for complete search history.

(56) References Cited

U.S. PATENT DOCUMENTS

| 4,677,137 A | * | 6/1987 | Bany ........................ G03F 7/029 |
|---|---|---|---|
| | | | 502/150 |
| 5,212,252 A | * | 5/1993 | Aoki ......................... C08F 8/00 |
| | | | 525/327.3 |
| 5,427,638 A | | 6/1995 | Goetz et al. |
| 5,453,450 A | | 9/1995 | Kinzer et al. |
| 5,599,622 A | | 2/1997 | Kinzer et al. |
| 5,670,006 A | | 9/1997 | Wilfong et al. |
| 5,721,289 A | | 2/1998 | Karim et al. |
| 8,535,473 B2 | | 9/2013 | Dietz |
| 2005/0211580 A1 | * | 9/2005 | Kaszubski ............... C08J 5/124 |
| | | | 206/223 |
| 2007/0213429 A1 | | 9/2007 | Cheng et al. |
| 2009/0104448 A1 | | 4/2009 | Thompson et al. |

FOREIGN PATENT DOCUMENTS

| JP | 2006-199894 | 8/2006 |
|---|---|---|
| JP | 2006-199894 A | 8/2006 |
| WO | WO 94/29399 | 12/1994 |
| WO | WO 96/09352 | 3/1996 |
| WO | WO 00/71632 | 11/2000 |
| WO | WO 03/040250 | 5/2003 |
| WO | WO 03/085062 | 10/2003 |
| WO | WO 2009/153274 | 12/2009 |

OTHER PUBLICATIONS

Epon Resins Publication, by Momentive Specialty Chemicals, Inc.*
PCT International Search Report from PCT/US2012/071123 dated Apr. 3, 2013, 3 pages.

* cited by examiner

*Primary Examiner* — Victor S Chang
(74) *Attorney, Agent, or Firm* — Philip P. Soo

(57) ABSTRACT

The present invention provides an adhesive tape composition and an adhesive tape prepared from same. Based on the total weight of the adhesive tape composition, the adhesive tape composition comprises: 25-75 wt. % of an acrylate monomer; 20-70 wt. % of an epoxy resin; 0.001-3 wt. % of a free radical photoinitiator; 0-10 wt. % of a fumed silica; and 0.02-5 wt. % of a cationic thermal initiator. According to the present invention, an adhesive tape having a room temperature retention time as long as 6 months that can be cured at low temperature such as 80 degree C. can be produced from the adhesive tape composition.

9 Claims, No Drawings

ADHESIVE TAPE COMPOSITION AND ADHESIVE TAPE PREPARED FROM SAME

TECHNICAL FIELD OF THE INVENTION

The present invention relates to an adhesive tape composition and an adhesive tape prepared from same. In particular, the present invention relates to a low temperature thermosetting structural adhesive composition and an adhesive tape prepared from same.

TECHNICAL BACKGROUND OF THE INVENTION

Current electronic products such as laptops, products for vehicles, portable mobile terminals are designed to be of small size, light weight, thin thickness and high efficiency in production. This trend requires that more and more plastic materials are used for such products. As for bonding techniques, extremely high adhesive strength would thus be required to achieve the bonding of small areas.

Typically, one-component or two-component structural glues may satisfy the bonding requirements of these products; however, such structural glues exhibit numerous flaws, for example, irremovable, not reworkable, uncontrollable bonding area which would result in an inaesthetic bonding surface. Some structural glues comprise a huge amount of solvent and thus it takes extremely long time (low efficiency), or require a high temperature (not adapted to plastic materials which can not withstand high temperature) for the glues to cure. All these flaws have limited extensive use of the structural glues in the aforesaid products.

Another typical widely used adhesive tape material is pressure-sensitive adhesive tape. Pressure-sensitive adhesive tape is very easy to use as the bonding can be achieved by exerting thereon only a very small force and thus a long period or high temperature cure becomes unnecessary. Pressure-sensitive adhesive tapes may be used directly upon shaped by die-cutting and achieve continuous production, and thus exhibit extremely high bonding efficiency. Nevertheless, pressure-sensitive adhesive tape has a flaw, i.e. the bonding strength being weak, generally smaller than 1 MPa, and thus it is not adapted to small area bonding.

Structural adhesive tape has both the advantages of structural glue and pressure-sensitive adhesive tape, i.e. structural adhesive tape can be used very easily like a pressure-sensitive adhesive tape, and can also be imparted the same strength of a structural glue or a semi-structural glue upon activation by a certain energy, such as UV light or heat).

WO 9957216 (A1) (Karim Naimul, e tal) employed a thermoplastic material, such as EVA, to hybridize with epoxy resin, and the cure of epoxy resin was initiated using a cationic photoinitiator to effect the bonding at room temperature; however, this method requires irradiation by UV light prior to bonding.

Furthermore, with respect to the currently developed structural adhesive tape, the room temperature retention time is relatively short (typically less than one month) and the retention and transportation needs to be done under freeze (lower than 5 degree C.) conditions. Additionally, the curing temperature is relatively high, which is typically up to 100 degree C.

Therefore, it is of significance to provide a structural adhesive tape which can be cured at a relatively low temperature and has a long retention time at room temperature.

SUMMARY OF THE INVENTION

The present invention relates to a structural adhesive tape composition which is cured at low temperature, in particular, to a low temperature curable structural adhesive tape comprising a hybrid system of acrylate/epoxy resin where the cure of epoxy resin is initiated by a cationic thermal initiator. The initiation temperature of the cationic thermal initiator can be as low as 80 degree C. and such a pressure-sensitive structural adhesive tape has a room temperature retention time as long as 6 months. As a result, the present invention can be used to bond plastic materials which can not endure a high temperature, such as acrylonitrile butadiene styrene (ABS), polycarbonate (PC), and polymethylmethacrylate (PMMA).

According to one aspect of the present invention, an adhesive tape composition is provided. The adhesive tape composition comprises:

25-75 wt. % of an acrylate monomer;
20-70 wt. % of an epoxy resin;
0.001-3 wt. % of a free radical photoinitiator;
0-10 wt. % of a fumed silica; and
0.02-5 wt. % of a cationic thermal initiator,
based upon the total weight of the adhesive tape composition.

According to another aspect of the present invention, an adhesive tape is provided. The adhesive tape is produced by a method comprising: coating the adhesive tape composition as described above in a liquid form onto a release material and curing the composition by UV irradiation.

Compared with prior art, a low temperature curable structural adhesive tape can be produced from the composition of the present invention. The structural adhesive tape can be cured by heating at low temperature, for example, 80 degree C. Another benefit of the present invention is that the adhesive tape can be preserved for a relatively long period of time at room temperature (as long as 6 months at room temperature), while currently available structural adhesive tapes all require low temperature freeze preservation (lower than 5 degree C.). As a result, the transportation and preservation costs can be significantly decreased.

DETAILED DESCRIPTION OF THE INVENTION

Unless otherwise provided in the invention, "room temperature" used herein refers to a temperature between 20 degree C. and 25 degree C.

A low temperature curable structural adhesive tape can be produced using the composition of the present invention. By "low temperature curable structural adhesive tape", it is meant that the structural adhesive tape exhibits the behavior of a typical pressure-sensitive adhesive tape at the initial stage of bonding (initial adhesion by which the articles can be bonded by exerting only a minor force; formable by die cutting); after cure by low temperature heating (for example, 80 degree C.), it can be transformed to an adhesive tape with a strength of from semi-structural strength to structural strength and thus the adhesive tape can be used to bond plastic articles which can not endure a high temperature, such as PC, PMMA, ABS and the like.

In the present invention, an adhesive tape composition is provided. The adhesive tape composition comprises:

25-75 wt. % of an acrylate monomer;
20-70 wt. % of an epoxy resin;
0.001-3 wt. % of a free radical photoinitiator;
0-10 wt. % of a fumed silica; and
0.02-5 wt. % of a cationic thermal initiator,
based upon the total weight of the adhesive tape composition.

In the adhesive tape composition according to the present invention, an acrylate monomer is used to provide the subsequently formed structural adhesive tape with initial adhesion to effect the initial adhesion of the materials to be bonded (for example, electronic devices). For the purpose of ensuring that the acrylate monomer is compatible well with other components contained in the composition, it is required to make selection as to the compatibility of the acrylate monomer. In the present invention, the solubility parameter of the acrylate monomer is between 9.3 and 13.5 $(cal/cm^3)^{0.5}$ (see, Journal of Applied Polymer Science, vol. 116, pages 1-9 (2010)). Examples of acrylate monomer useful in the present invention include one or more substance selected from the group consisting of tert-butyl acrylate (tBA, solubility parameter: 9.36), phenoxy ethyl acrylate (PEA, solubility parameter: 10.9), isobornyl acrylate (IBoA, solubility parameter: 9.71), Propenoic acid, 2-hydroxy-3-phenoxypropyl ester (HPPA, solubility parameter: 12.94), N-vinypyrrolidone (NVP, solubility parameter: 13.38), and n-vinyl-epsilon-caprolactam (NVC, solubility parameter: 12.1), and the like.

The amount of the acrylate monomer as described above present in the acrylate/epoxy resin hybrid system based structural adhesive tape composition of the present invention is typically between 25 wt. % and 75 wt. %, more preferably between 40 wt. % and 60 wt. %. As such, the acrylate monomer can be compatible well with the epoxy resin and bring very good toughening effect to the cured epoxy resin.

Epoxy resin is used in the adhesive tape composition of the present invention. By cure of the epoxy resin via heating at low temperature (about 80 degree C.), a complete cure of the adhesive tape produced from the adhesive tape composition may be provided, and thus impart the adhesive tape a desired strength. According to some preferred embodiments of the present invention, the epoxy resin used herein may contain at least two epoxy groups in the molecule and the epoxy equivalent may be in the range of between 150 and 600. In particular, widely known epoxy resins such as ring ester epoxy resins and epoxidation polyolefins such as glycidyl ethers derived from the reactions of epichlorhydrin with polyphenols such as bisphenol A, bisphenol F, bisphenol S, hexahydrohsphenol A. tetramethylbisphenol A, diaryl bisphenol A, and tetramethylbisphenol F. Examples of commercially available epoxy resins include YD128 having an epoxy equivalent of about 187, and KD212 having an epoxy equivalent of 535 (Kudko Chemical, Kunshan, Jiangsu, China).

The amount of the epoxy resins as described above present in the acrylate/epoxy resin hybrid system based structural adhesive tape composition of the present invention is typically between 20 wt. % and 70 wt. %, more preferably between 30 wt. % and 60 wt. %. As such, a sufficient strength of the structural adhesive tape can be ensured after cure.

A free radical photoinitiator is used in the adhesive tape composition of the present invention to polymerize the acrylate monomers under irradiation of light (for example, UV light) to provide an initial adhesion. A free radical photoinitiator is a compound which a photochemical reaction may occur to generate free radicals upon being irradiated by light. The free radicals generated by the free radical photoinitiator can initiate free radical polymerization of the system which would result in cure of the same. Photoinitiators of different structures may have different absorption spectrum and free radical activity. Examples of free radical photoinitiators include: acetophenones such as 2,2-dimethoxy-2-phenylacetophenone (BDK), 1-hydroxycyclohexyl phenyl ketone (184), 2-hydroxy-2-methyl-phenyl-propane-1-one (1173), thioxanthones such as 2-isopropyl thioxanthone or 4-isopropyl thioxanthone (ITX), acryl phosphine oxides such as 2,4,6-trimethylbenzoyldiphenyl phosphine oxide (TPO) and 2,4,6-trimethylbenzoyldiphenyl phosphine oxide (819), and the like.

The amount of the free radical photoinitiators as described above present in the acrylate/epoxy resin hybrid system based structural adhesive tape composition of the present invention is typically between 0.001 wt. % and 3.0 wt. %, more preferably between 0.25 wt. % and 2.2 wt. %. If the amount of the free radical photoinitiators is too low, the curing speed of the low temperature cure pressure-sensitive structural glue may be too slow upon UV light irradiation and thus the coating speed may be slow. If the amount of the free radical photoinitiators is too high, the curing speed of the low temperature cure pressure-sensitive structural glue may be too quick upon UV light irradiation and thus the molecular weight of the resulting acrylate copolymer may be too low, which may not be able to toughen the epoxy resins effectively.

According to some preferred embodiments of the present invention, a fumed silica may be added to the acrylate/epoxy resin hybrid system based structural adhesive tape composition of the present invention to adjust the viscosity of the composition such that a viscosity required for the coating of the composition can be achieved. The fumed silica would not be limited so long as it can be used to adjust the viscosity of the glue. Commercially available fumed silica includes R974, which is produced by EVONIK Indusrries.

The amount of fumed silica as described above present in the acrylate/epoxy resin hybrid system based structural adhesive tape composition of the present invention is typically between 0 wt. % and 10 wt. %, more preferably between 3 wt. % and 5 wt. %. By using the fumed silica in an amount in the range as provided above would result in an optimal coordination between tensile strength and elongation. When the amount of fumed silica is zero, the resulting adhesive tape composition would be relatively thin, while when the amount of the fumed silica is 10, the resulting adhesive tape composition would be very thick; however, the both as described above can achieve the purpose of the present invention, i.e. to provide a structural adhesive tape which can be cured at relatively low temperature and preserved for a long period of time at room temperature. Even so, when the amount of the fumed silica is greater than 10 wt. %, the resulting adhesive tape may be too rigid.

A cationic thermal initiator is used in the adhesive tape composition of the present invention to facilitate a complete cure of the adhesive tape composition at low temperature (80 degree C.) heating such that the adhesive tape is provided with an ultimate strength. The amount of the cationic thermal initiator used in the acrylate/epoxy resin hybrid system based structural adhesive tape composition is very small; however, it would exhibit a significant effect on the curing speed and preservation stability of the acrylate/epoxy resin hybrid system based structural adhesive tape composition.

The cationic thermal initiator is selected from one or more substance selected from the group consisting of a hexafluoroantimonate, trifluoromethanesulfonic acid, and the like. Examples of commercially available cationic thermal initiator include: ICAM8409 (a hexafluoroantimonate cationic thermal initiator) produced by Shenzhen Chuchuang Applied Materials Co., Ltd), CXC-1612 (a hexafluoroantimonate cationic thermal initiator) produced by Jinshi Co., Ltd and CXC-1614 (a trifluoromethanesulfonic acid cationic thermal initiator) also produced by Jinshi Co., Ltd.

The amount of the cationic thermal initiator as described above present in the acrylate/epoxy resin hybrid system based structural adhesive tape composition of the present invention is typically between 0.02 wt. % and 5 wt. %, more preferably between 0.5 wt. % and 2.5 wt. %. If the amount of the cationic thermal initiator in the composition is too low, the required curing temperature would be high, the curing speed would be slow but the preservation stability at room temperature would be good. In contrast, if the amount of the cationic thermal initiator in the composition is too high, the required curing temperature would be low, the curing speed would be high but the preservation stability at room temperature would be decreased.

The viscosity of the acrylate/epoxy resin hybrid system based structural adhesive tape composition of the present invention should be in the range of between 500 cPs and 23,000 cPs, more preferably in the range of between 1,500 cPs and 16,000 cPs prior to the cure upon irradiation by UV light. Neither extremely high viscosity nor extremely low viscosity would facilitate the coating of the acrylate/epoxy resin hybrid system based structural adhesive tape composition.

According to another aspect of the present invention, an adhesive tape is provided. The adhesive tape is produced according to the following method comprising: coating the adhesive tape composition as described above in a liquid form onto a release material and curing the composition by UV irradiation.

The acrylate/epoxy resin hybrid system based structural adhesive tape composition of the present invention may be coated in a liquid form onto a double sided release paper or a release film of a certain thickness using a conventional coating method, and dried and cured by UV irradiation to form a glue film having a certain thickness.

Useful coating methods include roller blade coating, comma roll coating, drag blade coating, reverse roll coating, Mayer coating, gravure roll coating, slot die coating, and the like. More preferable coating methods are comma roll coating and slot die coating.

Settings of light intensity and residence time for the UV oven which is used to partially cure the composition of the present invention by UV irradiation may be the following: area 1: 2.2 mw/cm$^2$, residence time: 50 s; area 2: 9.1 mw/cm$^2$, residence time: 60 s; area 3: 18 mw/cm$^2$, residence time: 9 s.

The low temperature curable adhesive tape obtained from the present invention has a thickness (dry glue thickness) of from 8 μm to 250 μm, preferably from 25 μm to 150 μm, more preferably from 50 μm to 125 μm. Too thick or too thin are not good for coating and use.

Testing Methods

The samples obtained from the examples and the comparative examples were tested according to the testing methods below.

90° Peel Test

90° peel test was conducted on the samples according to the method described in FINAL FTM 2 (the 8$^{th}$ edition, FINAT TECHNICAL MANNUAL FOR TESTING METHODS) (Published by the FINAT Technical Committee in July, 2009) to obtain the release force, peel strength and shear strength.

Room Temperature Retention Test

Release force changes were measured with respect to the samples at room temperature, upon a certain period of storage, according to the 90° peel test method as described above to assess the room temperature retention performance, that is, the adhesive tape just produced according to the present invention was first tested to determine the 90° release force $P_0$, and after a period of storage at room temperature, the adhesive tape sample was then tested using the same method to determine the 90° release force $P_1$. If the 90° release force $P_1$ of the adhesive sample can be up to 80% of the 90° release force $P_0$ after a period of storage, the period of storage can be deemed as the longest retention period of the adhesive tape.

Low Temperature Cure Test

The release paper for the low temperature thermosetting structural adhesive tape was removed and the glue surface of the tape was attached to a standard test steel plate and then the standard test steel plate attached with the adhesive tape was placed into an 80 degree C. oven for 3 hours. Next, the standard test steel plate attached with the adhesive tape was placed in an environment of 25 degree C. and 50% constant humidity prior to being tested for cure performance. In the cure performance test, the release paper on the other side of the adhesive tape after storage was removed and the exposed tape may be pressed by a finger. If the tape was not tacky, it can be deemed that the adhesive has been cured completely.

EXAMPLES

Examples will be provided to further describe the present invention. It should be understood that the scope of the present invention would be defined by the appended claims rather than be limited to the examples.

Unless otherwise provided, the percentage used herein refers to weight percentage.

Materials:

| Product Name | Description | Supplier |
|---|---|---|
| PEA | phenoxy ethyl acrylate (PEA, solubility parameter: 10.9) | San Ester Company |
| t-BA | tert-butyl acrylate (tBA, solubility parameter: 9.36) | BASF |
| IBoA | isobornyl acrylate (IBoA, solubility parameter: 9.71) | San Ester Company |
| YD128 | epoxy resin, epoxy equivalent: 197, in liquid form at room temperature under atmosphere | Kudko Chemical (Kunshan) Co., Ltd |
| KD212 | epoxy resin (glycidyl ether of bisphenol A, CAS No. 25036-25-3); epoxy equivalent: 535 | Kudko Chemical (Kunshan) Co., Ltd |
| R974 | hydrophobic fumed silica | EVONIK Industries |
| Irgacure651 | Free radical photoinitiator, 2, 2-dimethoxy-2-phenylacetophenone | Ciba |
| ICAM 8409 | a hexafluoroantimonate cationic thermal initiator, initiation temperature: 80 degree C. | Shenzhen Chuchuang Applied Materials Co., Ltd |
| CXC-1612 | a closed type hexafluoroantimonate cationic thermal initiator, initiation temperature: 80 degree C. | Jinshi Co., Ltd |
| CXC-1614 | a trifluoromethanesulfonic acid cationic thermal initiator, initiation temperature: 100 degree C. | Jinshi Co., Ltd |

Example 1

| Components | Percentage (%) |
|---|---|
| PEA | 24.88 |
| tBA | 25.38 |
| YD128 | 33.93 |
| KD212 | 11.31 |
| R974 | 3.52 |
| Irgacure651 | 0.15 |
| ICAM 8409 | 0.83 |

At room temperature, an air agitator (ZD-J-1, available from Shanghai Zuoda Coating Equipments Co., Ltd) was used to mix 62.20 g of PEA, 63.45 g of tBA, 84.83 g of YD128, 28.28 g of KD212, 0.38 g of Irgacure651 and 2.08 g of ICAM8409 for 30 minutes to obtain an acrylate/epoxy resin hybrid solution having a viscosity being 155 cPs. Next, 8.80 g of R974 was added to the system above and subjected to high speed dispersion for 20 minutes to make the system have a viscosity of up to 6500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 9 months; the adhesive tape was cured completely upon heating at 80 degree C. for 0.5 hours; the 90 degree peel strength of the adhesive tape with respect to the stainless steel plate was up to 2.344 N/mm; the shear strength was up to 5.45 MPa.

Example 2

| Components | Percentage (%) |
|---|---|
| PEA | 24.88 |
| tBA | 25.38 |
| YD128 | 34.49 |
| KD212 | 11.31 |
| R974 | 3.52 |
| Irgacure651 | 0.15 |
| ICAM8409 | 0.27 |

At room temperature, an air agitator (ZD-J-1, available from Shanghai Zuoda Coating Equipments Co., Ltd) was used to mix 62.20 g of PEA, 63.45 g of tBA, 86.23 g of YD128, 28.28 g of KD212, 0.38 g of Irgacure651 and 0.68 g of ICAM8409 for 30 minutes to obtain an acrylate/epoxy resin hybrid solution having a viscosity of 155 cPs. Next, 8.80 g of R974 was added to the system above and subjected to high speed dispersion for 20 minutes to make the system have a viscosity being up to 6500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 1 year; the adhesive tape was cured completely upon heating at 80 degree C. for 3 hours; the 90 degree peel strength of the adhesive tape with respect to the stainless steel plate was up to 1.24 N/mm; the shear strength was up to 3.64 MPa.

Compared with example 1, the amount of the cationic thermal initiator used in example 2 was decreased, and thereby the room temperature retention time was extended but the strength was somewhat decreased.

Example 3

| Components | Percentage (%) |
|---|---|
| PEA | 24.88 |
| tBA | 25.38 |
| YD128 | 32.53 |
| KD212 | 11.31 |
| R974 | 3.52 |
| Irgacure651 | 0.15 |
| ICAM8409 | 2.23 |

At room temperature, an air agitator (ZD-J-1, available from Shanghai Zuoda Coating Equipments Co., Ltd) was used to mix 62.20 g of PEA, 63.45 g of tBA, 81.33 g of YD128, 28.28 g of KD212, 0.38 g of Irgacure651 and 5.58 g of ICAM8409 for 30 minutes to obtain an acrylate/epoxy resin hybrid solution having a viscosity of 155 cPs. Next, 8.80 g of R974 was added to the system above and subjected to high speed dispersion for 20 minutes to make the system have a viscosity of up to 6500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 1 month; the adhesive tape was cured completely upon heating at 80 degree C. for 5 minutes; the 90 degree peel strength of the adhesive tape with respect to the stainless steel plate was up to 0.87 N/mm; the shear strength was up to 2.64 MPa.

Compared with examples 1 and 2, the amount of the cationic thermal initiator in example 3 was too high and thus the room temperature retention time of the resultant adhesive tape was too short, and the strength was decreased due to excess reaction after the low temperature cure.

Example 4

| Components | Percentage (%) |
| --- | --- |
| PEA | 22.6 |
| IBoA | 29.95 |
| YD128 | 45.46 |
| R974 | 1.68 |
| Irgacure651 | 0.15 |
| CXC-1612 | 0.16 |

At room temperature, an air agitator (ZD-J-1, available from Shanghai Zuoda Coating Equipments Co., Ltd) was used to mix 56.50 g of PEA, 74.88 g of IBoA, 113.65 g of YD128, 0.38 g of Irgacure651 and 0.4 g of CXC-1612 for 30 minutes to obtain an acrylate/epoxy resin hybrid solution having a viscosity of 75 cPs. Next, 4.20 g of R974 was added to the system above and subjected to high speed dispersion for 20 minutes to make the system have a viscosity of up to 1,500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 1 year; the adhesive tape was cured completely upon heating at 80 degree C. for 3 hours; the 90 degree peel strength of the adhesive tape with respect to the stainless steel plate was up to 1.07 N/mm; the shear strength was up to 4.48 MPa.

Compared with examples 1 and 2, the cationic thermal initiator used in example 4 was a closed type cationic thermal initiator and the amount of the same was much lower. As a result, the room temperature retention time of the adhesive tape was up to more than 1 year, but the strength was somewhat decreased.

Example 5

| Components | Percentage (%) |
| --- | --- |
| PEA | 22.6 |
| IBoA | 29.95 |
| YD128 | 43.24 |
| R974 | 3.52 |
| Irgacure651 | 0.15 |
| CXC-1612 | 0.54 |

At room temperature, an air agitator (ZD-J-1, available from Shanghai Zuoda Coating Equipments Co., Ltd) was used to mix 56.50 g of PEA, 74.88 g of IBoA, 108.10 g of YD128, 0.38 g of Irgacure651 and 1.35 g of CXC-1612 for 30 minutes to obtain an acrylate/epoxy resin hybrid solution having a viscosity of 75 cPs. Next, 8.80 g of R974 was added to the system above and subjected to high speed dispersion for 20 minutes to make the system have a viscosity being up to 1,500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 9 months; the adhesive tape was cured completely upon heating at 80 degree C. for 30 minutes; the 90 degree C. peel strength of the adhesive tape with respect to the stainless steel plate was up to 1.77 N/mm; the shear strength was up to 7.48 MPa.

Compared with example 4, the cationic thermal initiator used in example 5 was a closed type cationic thermal initiator and the amount of the same was increased. As a result, the room temperature retention time of the adhesive tape was shortened, but the strength was somewhat increased.

Example 6

| Components | Percentage (%) |
| --- | --- |
| PEA | 22.6 |
| IBoA | 29.95 |
| YD128 | 39.62 |
| R974 | 6.32 |
| Irgacure651 | 0.15 |
| CXC-1612 | 1.36 |

At room temperature, an air agitator (ZD-J-1, available from Shanghai Zuoda Coating Equipments Co., Ltd) was used to mix 56.50 g of PEA, 74.88 g of IBoA, 99.05 g of YD128, 0.38 g of Irgacure651 and 3.40 g of CXC-1612 for 30 minutes to obtain an acrylate/epoxy resin hybrid solution having a viscosity of 75 cPs. Next, 15.80 g of R974 was added to the system above and subjected to high speed dispersion for 20 minutes to make the system have a viscosity being up to 15,500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 3 months; the adhesive tape was cured completely upon heating at 80 degree C. for 5 minutes; the 90 degree peel strength of the adhesive tape with respect to the stainless steel plate was up to 1.32 N/mm; the shear strength was up to 2.50 MPa.

Compared with examples 4 and 5, the cationic thermal initiator used in example 6 was a closed type cationic thermal initiator and the amount of the same was increased. As a result, the room temperature retention time of the adhesive tape was shortened, and the strength was somewhat decreased due to excess reaction after cure.

Example 7

| Components | Percentage (%) |
|---|---|
| PEA | 24.88 |
| tBA | 25.38 |
| YD128 | 33.93 |
| KD212 | 11.31 |
| R974 | 3.52 |
| Irgacure651 | 0.15 |
| CXC-1614 | 0.83 |

At room temperature, an air agitator (ZD-J-1, available from Shanghai Zuoda Coating Equipments Co., Ltd) was used to mix 62.20 g of PEA, 63.45 g tBA, 84.83 g of YD128, 0.38 g of Irgacure651 and 2.08 g of CXC-1614 for 30 minutes to obtain an acrylate/epoxy resin hybrid solution having a viscosity of 155 cPs. Next, 8.80 g of R974 was added to the system above and subjected to high speed dispersion for 20 minutes to make the system have a viscosity of up to 6500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 1.5 years; the adhesive tape was cured completely upon heating at 105 degree C. for 5 minutes; the 90 degree peel strength of the adhesive tape with respect to the stainless steel plate was up to 2.87 N/mm; the shear strength was up to 8.64 MPa.

Compared with example 1, the initiation temperature of the cationic thermal initiator used in example 7 was increased (100 degree C.). As a result, the room temperature retention time of the adhesive tape was up to 1.5 years, and both the peel strength and the shear strength were somewhat increased after the high temperature cure (105 degree C.).

Example 8

| Components | Percentage (%) |
|---|---|
| PEA | 52.55 |
| YD128 | 43.24 |
| R974 | 3.52 |
| Irgacure651 | 0.15 |
| CXC-1612 | 0.54 |

At room temperature, an air agitator (ZD-J-1, available from Shanghai Zuoda Coating Equipments Co., Ltd) was used to mix 131.38 g of PEA, 108.10 g of YD128, 0.38 g of Irgacure651 and 1.35 g of CXC-1612 for 30 minutes to obtain an acrylate/epoxy resin hybrid solution having a viscosity of 75 cPs. Next, 8.80 g of R974 was added to the system above and subjected to high speed dispersion for 20 minutes to make the system have a viscosity of up to 1,500 cPs. The resultant mixture was left to stand for 20 minutes to remove air bubbles. A comma roll coater (YS-T300, available from Changzhou Yongsheng Packing Co. Ltd) was used to coat the resultant mixture onto a PET release film (Mitsubishi polyester film, Hostaphan 2 SAB/SAC, 0.05 mm thick) which was coated on both sides with silicon release agent (Dow Corning, DC-292) to obtain a PET release film coated with the adhesive tape composition having a coating thickness being controlled to 50 microns (dry glue thickness). Then, another layer of PET release film (Mitsubishi polyester film, Hostaphan 2 SAB/SAC, 0.05 mm thick) was covered on the adhesive tape composition coating layer of the PET release film which was coated with the adhesive tape composition to obtain an adhesive tape.

The adhesive tape so obtained was tested according to the testing methods as described above and the results indicated that the room temperature retention time of the adhesive tape was 9 months; the adhesive tape was cured completely upon heating at 80 degree C. for 25 minutes; the 90 degree peel strength of the adhesive tape with respect to the stainless steel plate was up to 1.43 N/mm; the shear strength was up to 6.73 MPa.

Compared with other examples, only an acrylate monomer and an epoxy resin were used in example 8. As a result, the room temperature retention time of the adhesive tape was kept substantially unchanged, and both the peel strength and the shear strength were not high; however, example 8 could also achieve the purpose of the present invention.

Although examples have been provided to further describe the present invention, it should be understood that the scope of the present invention would rather be defined by the appended claims than be limited to the examples. The person of ordinary skill in the art will understand that various modifications and alterations may be made without departing the spirit of the present invention, and such modifications and alterations would rather be covered by the scope of the present invention which is defined by the appended claims.

What is claimed is:

1. A bonding tape composition, based on the total weight of the bonding tape composition, comprising:
    25-75 percent by weight of an acrylate monomer;
    20-70 percent by weight of an epoxy resin;
    0.001-3 percent by weight of a radical photo-initiator;
    3-5 percent by weight of a hydrophobic fumed silica; and
    0.02-5 percent by weight of a cationic thermal initiator which is a trifluoromethanesulfonic acid cationic thermal initiator.

2. The bonding tape composition according to claim 1, wherein the acrylate monomer has a solubility parameter in a range of 9.3 to 13.5.

3. The bonding tape composition according to claim 1, wherein the acrylate monomer is one or more selected from the group consisting of tert-butyl acrylate, phenoxyethyl acrylate, isobornyl acrylate, 2-hydroxyl-3-phenoxypropyl acrylate, N-vinyl-2-pyrrolidone, and N-vinylcaprolactam.

4. The bonding tape composition according to claim 1, wherein the epoxy resin has an epoxy equivalent in a range of 150 to 600.

5. The bonding tape composition according to claim 1, wherein the radical photo-initiator is one or more selected from the group consisting of 2, 2-dimethoxy-2-phenyl acetophenone, 1-hydroxylcyclohexylphenylmethanone, 2-hydroxyl-2-methyl-1-phenylpropane-1-one, 2-isopropylthioxanthone, 4-isopropylthioxanthone, 2, 4, 6-trimethylbenzoyldiphenylphosphine oxide, and bis(2, 4, 6-trimethylbenzoyl)-phenylphosphine oxide.

6. The bonding tape composition according to claim 1, wherein the bonding tape composition has a viscosity in a range of 500 to 23000 cPs.

7. A bonding tape prepared by coating a bonding tape composition according to claim 1 in liquid form onto a releasing material and curing the bonding tape composition by irradiating ultraviolet light.

8. The bonding tape according to claim 7, wherein the releasing material is releasing paper or releasing film.

9. The bonding tape according to claim 7, wherein the bonding tape has a thickness of 8-250 μm.

* * * * *